(12) United States Patent
Henry et al.

(10) Patent No.: US 9,389,863 B2
(45) Date of Patent: Jul. 12, 2016

(54) PROCESSOR THAT PERFORMS APPROXIMATE COMPUTING INSTRUCTIONS

(71) Applicant: VIA TECHNOLOGIES, INC., New Taipei (TW)

(72) Inventors: G. Glenn Henry, Austin, TX (US); Terry Parks, Austin, TX (US); Rodney E. Hooker, Austin, TX (US)

(73) Assignee: VIA ALLIANCE SEMICONDUCTOR CO., LTD., Shanghai (CN)

( * ) Notice: Subject to any disclaimer, the term of this patent is extended or adjusted under 35 U.S.C. 154(b) by 43 days.

(21) Appl. No.: 14/522,512

(22) Filed: Oct. 23, 2014

(65) Prior Publication Data

US 2015/0227372 A1    Aug. 13, 2015

Related U.S. Application Data

(60) Provisional application No. 61/937,741, filed on Feb. 10, 2014.

(51) Int. Cl.
G06F 9/30 (2006.01)
G06F 11/07 (2006.01)

(52) U.S. Cl.
CPC ........ *G06F 9/30145* (2013.01); *G06F 9/30076* (2013.01); *G06F 9/30185* (2013.01); *G06F 11/0721* (2013.01); *G06F 11/0793* (2013.01)

(58) Field of Classification Search
None
See application file for complete search history.

(56) References Cited

U.S. PATENT DOCUMENTS 5,386,375 A * 1/1995 Smith ............... G06F 7/5525
708/500
8,397,187 B2 3/2013 Sawada
(Continued)

FOREIGN PATENT DOCUMENTS

CN        1993679 A      7/2007
CN      101859243 A     10/2010
(Continued)

OTHER PUBLICATIONS

Jin Miao, Ku He, Andreas Gerstlauer, and Michael Orshansky. "Modeling and Synthesis of Quality-Energy Optimal Approximate Adders" IEEE/ACM International Conference on Computer-Aided Design (ICCAD) 2012, Nov. 5-8, 2012.*

(Continued)

*Primary Examiner* — Jacob A Petranek
(74) *Attorney, Agent, or Firm* — E. Alan Davis; Eric W. Cernyar; James W. Huffman

(57) ABSTRACT

A processor includes a decoder that decodes an instruction that instructs the processor to perform subsequent computations in an approximate manner and a functional unit that performs the subsequent computations in the approximate manner in response to the instruction. An instruction instructs the processor to clear an error amount associated with a value stored in a general purpose register of the processor. The error amount indicates an amount of error associated with a result of a computation performed by the processor in an approximate manner. The processor also clears the error amount in response to the instruction. Another instruction specifies a computation to be performed and includes a prefix that indicates the processor is to perform the computation in an approximate manner. The functional unit performs the computation specified by the instruction in the approximate manner specified by the prefix.

25 Claims, 9 Drawing Sheets

(56) References Cited

U.S. PATENT DOCUMENTS

| | | | |
|---|---|---|---|
| 2005/0004957 A1 | 1/2005 | Chatterjee | |
| 2005/0004958 A1 | 1/2005 | Contini et al. | |
| 2005/0228837 A1 | 10/2005 | Marostica et al. | |
| 2006/0271615 A1 | 11/2006 | Shearer | |
| 2012/0079250 A1 | 3/2012 | Pineiro et al. | |
| 2014/0143564 A1* | 5/2014 | Tannenbaum | G06F 7/4876 713/320 |
| 2014/0143780 A1* | 5/2014 | Strauss | G06F 17/10 718/100 |
| 2015/0227429 A1 | 8/2015 | Henry et al. | |
| 2015/0309897 A1* | 10/2015 | Shan | G06F 11/3024 714/10 |

FOREIGN PATENT DOCUMENTS

| | | |
|---|---|---|
| CN | 102736896 A | 10/2012 |
| CN | 103019876 A | 4/2013 |

OTHER PUBLICATIONS

Wei-Ting J. Chan, Andrew B. Kahng, Seokhyeong Kang, Rakesh Kumar, and John Sartori. "Statistical Analysis and Modeling for Error Composition in Approximate Computation Circuits" 2013 IEEE 31st International Conference on Computer Design, ICCD 2013, Oct. 6, 2013-Oct. 9, 2013.*

Venkataramani, Swagath et al. "Quality Programmable Vector Processors for Approximate Computing." Proceedings of the 46th Annual IEEE/ACM International Symposium on Microarchitecture Dec. 11, 2013 pp. 3,5,8 & 9.

PCT/IB2014/003160. International Search Report (ISR) and Written Opinion (WO). Provided by State Intellectual Property Office of the P.R. China. Jul. 6, 2015. pp. 1-8.

PCT/IB2014/003167. International Search Report (ISR) and Written Opinion (WO). Provided by State Intellectual Property Office of the P.R. China. Jun. 26, 2015. pp. 1-8.

PCT/IB2014/003137. International Search Report (ISR) and Written Opinion (WO). Provided by State Intellectual Property Office of the P.R. China. Jun. 30, 2015. pp. 1-10.

Han, Jie et al. "Approximate Computing: An Emerging Paradigm for Energy-Efficient Design." Downloaded Oct. 21, 2013 from http://users.ece.utexas.edu/~michael/ETS2013.pdf pp. 1-6.

Lau, Mark S.K. et al. "Energy-Aware Probabilistic Multiplier: Design and Analysis." Downloaded Oct. 21, 2013 from https://edventure.ntu.edu.sg/bbcswebdav/users/ekvling/Public/PCMOS/cases032s-lau.pdf Oct. 11-16, 2009. pp. 1-10.

"Transactional Synchronization Extensions" Wikipedia.pdf Downloaded Oct. 22, 2013 from http://en.wikipedia.org/wiki/Transactional_Synchronization_Extensions pp. 1-3.

"Intel® Transactional Synchronization Extensions (Intel® TSX) Overview" Intel Developer Zone.pdf. Downloaded Oct. 22, 2013 from http://software.intel.com/en-us/node/461962.

"Approximate Computing" Research Weblog. Downloaded Oct. 21, 2013 from http://shakithweblog.blogspot.com/2012/11/approximate-computing.html. pp. 1-2.

"intel® Architecture Instruction Set Extensions Programming Reference" Intel® Jul. 2013 pp. 5-613 thru 5-620 and 5-635 thru 5-642.

"Approximate Computing Improves Efficiency, Saves Energy" Purdue University. Dec. 17, 2013. Downloaded from http://www.purdue.edu/newsroom/releases/2013/Q4/approximate-computing-improves-efficiency,-saves-energy.html pp. 1-2.

* cited by examiner

┌── 300 COMPUTATION INSTRUCTION WITH APPROXIMATION PREFIX

| APPROXIMATION PREFIX 302 | OPCODE AND OTHER FIELDS 304 |

┌── 310 APPROXIMATE COMPUTATION INSTRUCTION

| APPROXIMATE COMPUTATION OPCODE AND OTHER FIELDS 312 |

┌── 320 COMPUTATION INSTRUCTION WITH START APPROXIMATION PREFIX

| START APPROXIMATION PREFIX 322 | OPCODE AND OTHER FIELDS 324 |

┌── 330 START APPROXIMATION INSTRUCTION

| START APPROXIMATION OPCODE 332 |

┌── 340 COMPUTATION INSTRUCTION WITH STOP APPROXIMATION PREFIX

| STOP APPROXIMATION PREFIX 342 | OPCODE AND OTHER FIELDS 344 |

┌── 350 STOP APPROXIMATION INSTRUCTION

| STOP APPROXIMATION OPCODE 352 |

┌── 360 COMPUTATION INSTRUCTION WITH CLEAR ERROR PREFIX

| CLEAR ERROR PREFIX 362 | OPCODE AND OTHER FIELDS 364 | REGISTER 366 |

┌── 370 CLEAR ERROR INSTRUCTION

| CLEAR ERROR OPCODE 372 | REGISTER 376 |

┌── 380 LOAD REGISTER AND CLEAR ERROR INSTRUCTION

| LOAD REGISTER OPCODE 382 | ADDRESS OPERANDS 384 | REGISTER 386 |

PROCESSOR THAT PERFORMS APPROXIMATE COMPUTING INSTRUCTIONS

CROSS REFERENCE TO RELATED APPLICATION(S)

This application claims priority based on U.S. Provisional Application, Ser. No. 61/937,741, filed Feb. 10, 2014, entitled PROCESSOR THAT PERFORMS APPROXIMATE COMPUTING INSTRUCTIONS; PROCESSOR THAT RECOVERS FROM EXCESSIVE APPROXIMATE COMPUTING ERROR; PROCESSOR WITH APPROXIMATE COMPUTING FUNCTIONAL UNIT, which is hereby incorporated by reference in its entirety.

This application is related to the following U.S. Non-Provisional Applications filed concurrently herewith and each of which is hereby incorporated by reference in its entirety: 14522512, 14522520, 14522530.

BACKGROUND

There has been a considerable amount of theoretical work in the area of approximate computing. Approximate computing attempts to perform computations in a manner that reduces power consumption in exchange for potentially reduced accuracy. Although approximate computing has been a favorite topic of academia, little has been produced regarding how to use approximate computing in a commercially viable processor.

BRIEF SUMMARY

In one aspect the present invention provides a processor. The processor includes a decoder configured to decode an instruction that instructs the processor to perform subsequent computations in an approximate manner. The processor also includes a functional unit configured to perform the subsequent computations in the approximate manner in response to the instruction.

In another aspect, the present invention provides a method performed by a processor. The method includes decoding, by the processor, an instruction that instructs the processor to perform subsequent computations in an approximate manner. The method also includes performing, by the processor, the subsequent computations in the approximate manner in response to said decoding the instruction.

In yet another aspect, the present invention provides a processor. The processor includes a general purpose register and a decoder configured to decode an instruction that instructs the processor to clear an error amount associated with a value stored in a general purpose register of the processor. The error amount indicates an amount of error associated with a result of a computation performed by the processor in an approximate manner. The processor is configured to clear the error amount in response to the instruction.

In yet another aspect, the present invention provides a method performed by a processor, the method includes decoding, by the processor, an instruction that instructs the processor to clear an error amount associated with a value stored in a general purpose register of the processor. The error amount indicates an amount of error associated with a result of a computation performed by the processor in an approximate manner. The method also includes clearing, by the processor, the error amount in response to said decoding the instruction.

In yet another aspect, the present invention provides a processor. The processor includes a decoder configured to decode an instruction. The instruction specifies a computation to be performed. The instruction includes a prefix that indicates the processor is to perform the computation in an approximate manner. The processor also includes a functional unit configured to perform the computation specified by the instruction in the approximate manner specified by the prefix.

In yet another aspect, the present invention provides a method performed by a processor. The method includes decoding, by the processor, an instruction, wherein the instruction specifies a computation to be performed, wherein the instruction includes a prefix that indicates the processor is to perform the computation in an approximate manner. The method also includes performing, by the processor, the computation specified by the instruction in the approximate manner specified by the prefix.

BRIEF DESCRIPTION OF THE DRAWINGS

FIG. 3 is a block diagram illustrating approximation instructions.

DETAILED DESCRIPTION OF THE EMBODIMENTS

Embodiments are described in which a processor performs approximate computations. Approximate computations occur when a computation is performed with a degree of accuracy that is less than the full accuracy that may be specified by the instruction set architecture of the processor.

Figure 1:
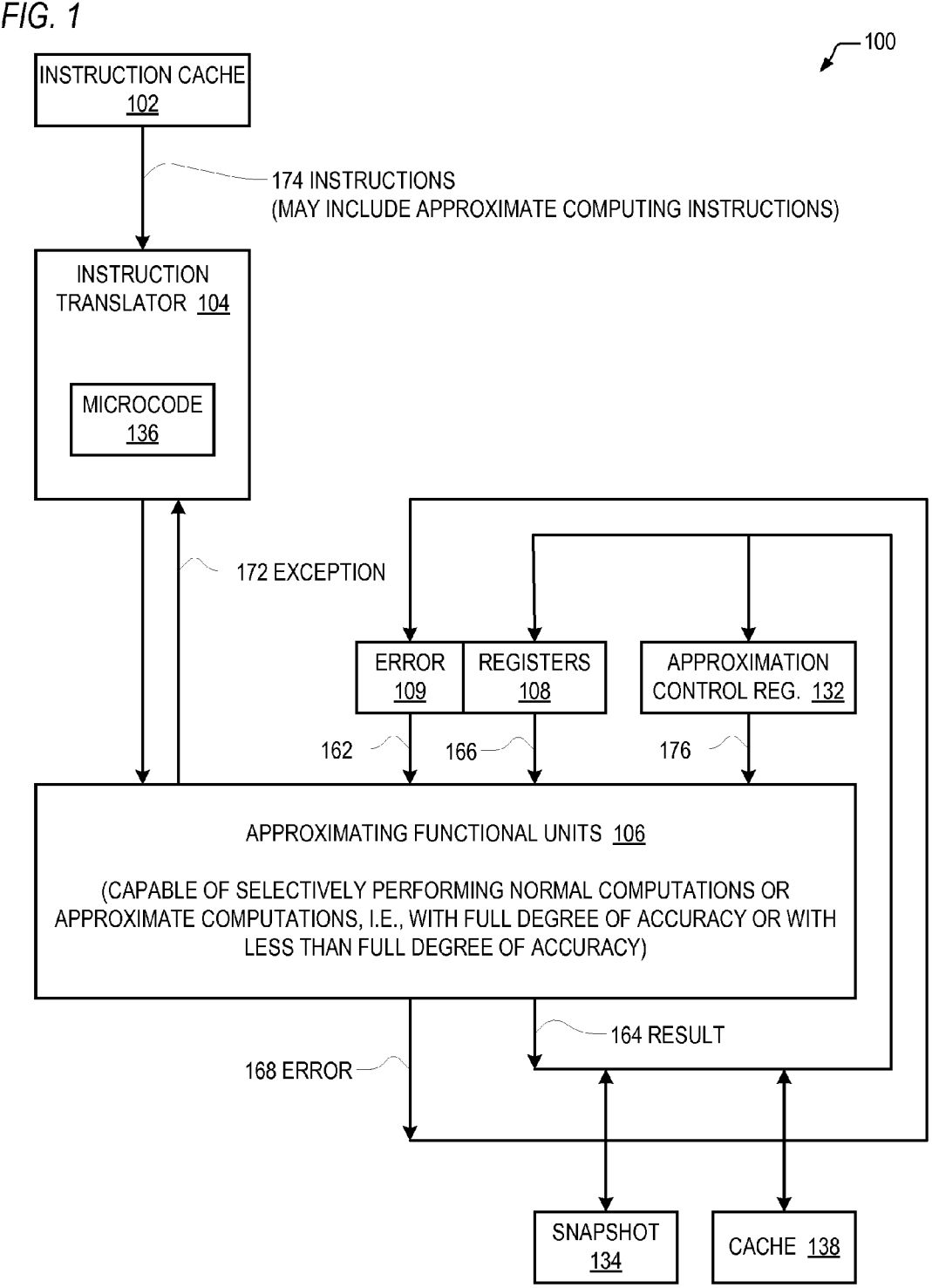
FIG. 1 is a block diagram illustrating an embodiment of a processor.

Referring now to FIG. 1, a block diagram illustrating an embodiment of a processor 100 is shown. The processor 100 comprises a programmable data processor that performs stored instructions, such as a central processing unit (CPU) or a graphics processing unit (GPU). The processor 100 includes an instruction cache 102; an instruction translator 104 coupled to the instruction cache 102; one or more approximating functional units 106 coupled to receive microinstructions from the instruction translator 104; architectural registers 108 coupled to provide instruction operands 166 to the approximating functional units 106; an approximation control register 132 coupled to the approximating functional units 106; a data cache memory 138 coupled to the approximating functional units 106; and a snapshot storage 134 coupled to the approximating functional units 106. The processor 100 may also include other units, for example, a renaming unit, instruction scheduler and/or reservation stations may be employed between the instruction translator 104 and the approximating functional units 106 and a reorder buffer may be employed to accommodate out-of-order instruction execution.

The instruction cache 102 caches architectural instructions 174 fetched from memory and performed by the processor 100. The architectural instructions 174 may include approximate computing instructions, such as embodiments of approximate computing instructions 399 described with respect to FIG. 3. The approximate computing instructions 399 control the approximate computing policies of the processor 100, namely, whether the approximating functional units 106 perform computations with a full degree of accuracy or with less than a full degree of accuracy and the degree less than the full degree. The approximate computing instructions 399 also control the clearing of an error amount associated with each of the general purpose registers of the processor 100, as described herein. Preferably, the processor 100 includes other functional units that are not approximating. In one embodiment, the architectural instructions 174 substantially conform to the x86 instruction set architecture (ISA) modified to include embodiments of the approximate computing instructions 399 described herein. Other embodiments are contemplated in which the ISA of the processor 100 is other than the x86 ISA.

The instruction translator 104 receives the architectural instructions 174 from the instruction cache 102. The instruction translator 104 includes an instruction decoder that decodes the architectural instructions 174 and translates them into microinstructions. The microinstructions are defined by a different instruction set than the architectural instruction set, namely the microarchitectural instruction set. The microinstructions implement the architectural instructions 174.

Preferably, the instruction translator 104 also includes microcode 136 that comprises microcode instructions, preferably stored in a read-only memory of the processor 100. In one embodiment, the microcode instructions are microinstructions. In an alternate embodiment, the microcode instructions are translated into microinstructions by a microtranslator. The microcode 136 implements a subset of the architectural instructions 174 of the processor 100 ISA that are not directly translated into microinstructions by a programmable logic array of the instruction translator 104. Additionally, the microcode 136 handles microarchitectural exceptions, such as are generated when the cumulative error bound generated by approximate computations exceeds an error bound, according to one embodiment.

The architectural registers 108 provide instruction (e.g., microinstruction) operands 166 to the approximating functional units 106 and receive the results generated by the approximating functional units 106, preferably via a reorder buffer (not shown). Associated with each of the architectural registers 108 is error storage 109 that holds an indication of an amount of error in the result stored in the associated register 108. Each time an approximating functional unit 106 generates a result 164 (which is written to an architectural register 108), the approximating functional unit 106 also generates an indication of the amount error 168 associated with the result 164 that has accumulated due to approximating computations. The error 168 is written to the error storage 109 associated with the destination register 108. Furthermore, each time a register 108 provides an operand to an approximating functional unit 106, the associated error storage 109 provides to the approximating functional unit 106 the error 162 associated with the operand. This enables the approximating functional unit 106 to accumulate both the error of the input operands 166 of the computation and the error introduced by the approximating functional unit 106 when performing the approximate computation.

The snapshot storage 134 holds a snapshot of the state of the processor 100. Before the processor 100 begins to perform approximate computations, it writes its state to the snapshot storage 134 so that if the accumulated error of a result of an approximate computation exceeds an error bound, the processor 100 may restore its state from the snapshot 134 and re-perform the computations without approximation, as described in more detail below according to one embodiment. In one embodiment, the snapshot storage 134 comprises a private memory of the processor 100. Preferably, the snapshot 134 includes the address of the first instruction in a set of instructions that perform approximate computations. In an embodiment (e.g., FIG. 10) in which the microcode 136 causes re-execution of the set of instructions but without approximation, the microcode 136 causes a branch to the address of the first instruction held in the snapshot 134.

The data cache 138 caches data from system memory locations. In one embodiment, the data cache 138 is a hierarchy of cache memories that includes a first-level data cache and a second level cache that backs the instruction cache 102 and the first-level cache. In one embodiment, the program that employs the approximate computations must insure that its data does not overflow the data cache 138 if it is to enjoy the recovery after exceeding the error bound feature provided by the processor 100.

In one embodiment, the approximation control register 132 holds information that specifies the approximation policy 176 for the processor 100 that is provided to the approximating functional units 106. Preferably, the approximation control register 132 includes an approximation flag, an approximation amount, and an error bound (or error threshold). The approximation flag indicates whether computations performed by the approximating functional units 106 should be full accuracy computations or approximate computations, i.e., in full accuracy mode or approximate computation mode (or approximating mode). The approximation amount tells the approximating functional units 106 the degree of accuracy less than the full degree they may employ to perform their approximate calculations. The error bound specifies the amount of accumulated error 168 that may be tolerated in a result 164 of an approximate computation, and beyond which the processor 100 signals that the error bound has been exceeded, preferably so that the computations may be performed again without approximation. In one embodiment, the approximating functional units 106 perform computations according to the approximation policy stored in the approximation control register 132. In an alternate embodiment, each instruction specifies the approximation policy to the approximating functional units 106, such as in a prefix. In one embodiment, the approximation control register 132 is writable by an instruction of the instruction set architecture of the processor 100.

The approximating functional units 106 are capable of selectively performing normal computations (i.e., with the full degree of accuracy specified by the instruction set architecture) or approximate computations (i.e., with less than the full degree of accuracy specified by the instruction set architecture). Each of the approximating functional units 106 is hardware or a combination of hardware and microcode within the processor 100 that performs a function associated with the processing of an instruction. More specifically, the hardware or combination of hardware and microcode performs a computation to generate a result. Examples of functional units include, but are not limited to, execution units, such as an integer unit, a single issue multiple data (SIMD) unit, a multimedia unit, and a floating point unit, such as a floating point multiplier, floating point divider and floating point adder. Advantageously, the approximating functional units 106 consume less power when performing approximate computations than when performing normal computations. Embodiments of the approximating functional units 106 are described in more detail with respect to FIG. 2.

Figure 2:
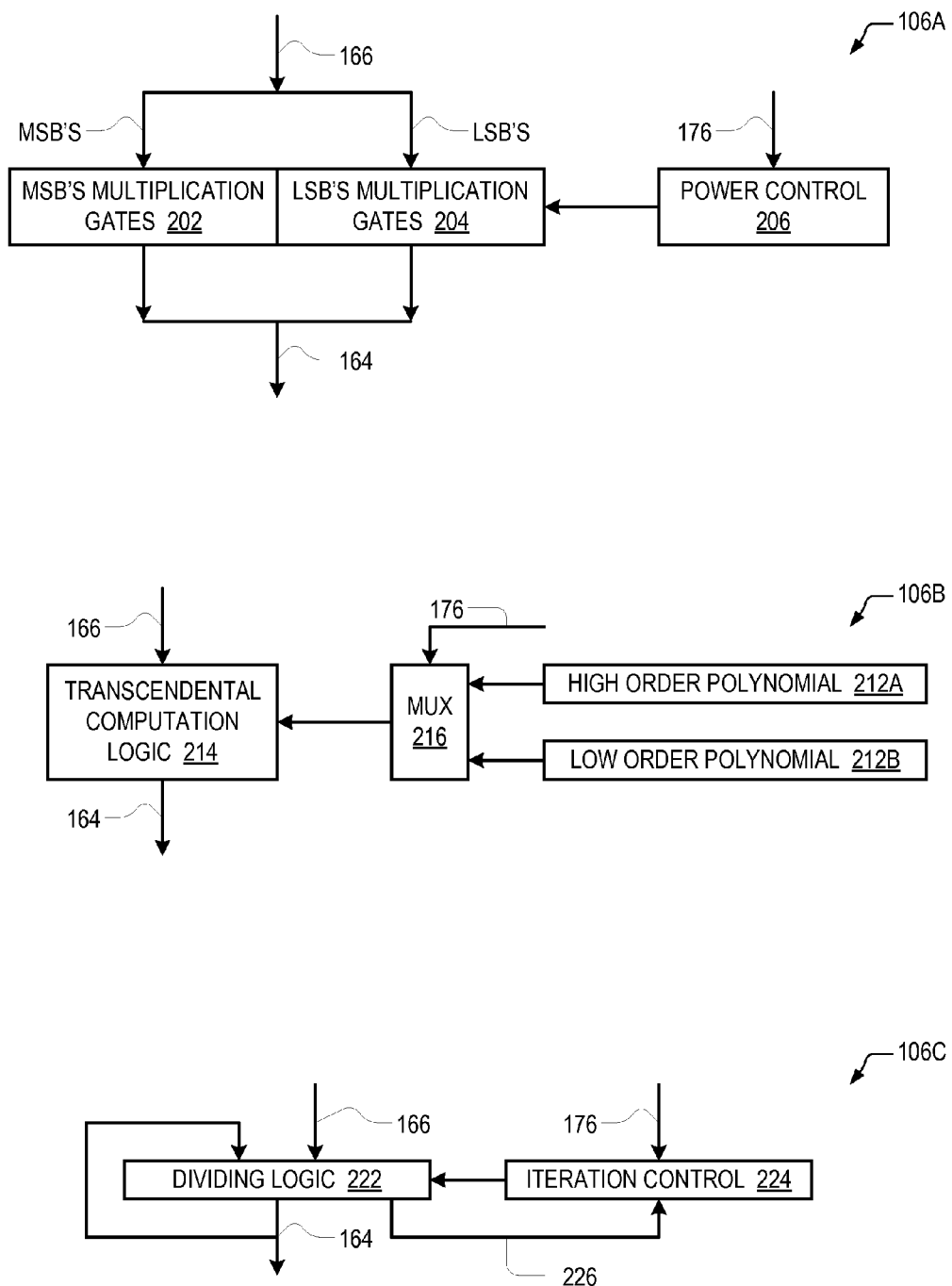
FIG. 2 is block diagrams illustrating three embodiments of the approximating functional units of FIG. 1.

Referring now to FIG. 2, block diagrams illustrating three embodiments of the approximating functional units 106 of FIG. 1 are shown. The three embodiments are an approximating floating point multiplier 106A, an approximating transcendental function computation unit 106B, and an approximating divider 106C.

The approximating floating point multiplier 106A receives input operands 166 from the registers 108 and generates the result 164 of FIG. 1. The approximating floating point multiplier 106A includes gates 202 that perform multiplication on the most significant bits of the input operands 166 and gates 204 that perform multiplication on the least significant bits of the input operands 166. The approximating floating point multiplier 106A also includes power control logic 206 that controls the selective provision of power to the least significant bit multiplication gates 204 based on the approximation policy 176. For example, if the approximation mode is full accuracy, the power control 206 causes power to be provided to the transistors of the least significant bit multiplication gates 204; whereas, if the approximation mode is less than the full accuracy, the power control 206 causes power not to be provided to the transistors of the least significant bit multiplication gates 204. In one embodiment, the least significant bit multiplication gates 204 are grouped such that the power control 206 powers off the gates associated with the multiplication of lesser or fewer of the least significant bits based on the approximation amount indicated in the approximation policy 176. Preferably, the approximating floating point multiplier 106A is configured such that intermediate results of the least significant bit multiplication gates 204 are provided to the most significant bit multiplication gates 202 (e.g., carries), and when the least significant bit multiplication gates 204 are powered-off in approximate computation mode, default values (e.g., zeroes) are provided as the intermediate results to the most significant bit multiplication gates 202.

Generally speaking, the approximating multiplier 106A is capable of multiplying N bits of each of two factors 166, where N bits is the full accuracy specified by the instruction set architecture. However, the approximating multiplier 106A is also capable of multiplying fewer than the N bits of each of the two factors 166 to generate a less accurate result 164 than the full accuracy. Preferably, the multiplier excludes M of the least significant bits of the factors 166 when performing the multiplication, where M is less than N. For example, assume the mantissas of the factors 166 are each 53 bits, then the transistors of the gates 204 of the approximating multiplier that would normally be used in the multiplication of the lower N bits of the 53 bits of the factors 166 are turned off such that the lower M bits of the factors 166 are not included in the approximate multiply, where the number of bits M is specified in the approximation policy, e.g., in the approximation control register 132. In this manner, the approximating multiplier 106A potentially uses less power in the approximating mode than in the full accuracy mode because it may turn off transistors that would normally be used to multiply the excluded bits. Preferably, the number of excluded bits M is quantized such that only a limited number of values of M may be specified by the approximation policy in order to reduce the complexity of the power gating logic 206.

The approximating transcendental function unit 106B receives input operands 166 from the registers 108 and generates the result 164 of FIG. 1. The approximating transcendental function computation unit 106B includes transcendental computation logic 214 that performs transcendental functions on the input operands 166 to generate the result 164 based on a polynomial. The polynomial is selected from a mux 216 that selects either a high order polynomial 212A or a low order polynomial 212B based on a select control input from the computation policy 176, such as the approximation mode. That is, the mux 216 selects the high order polynomial 212A when the approximating mode is full accuracy and selects the low order polynomial 212B when the approximating mode is less than the full accuracy. Generally speaking, the approximating transcendental function computation unit 106B uses a polynomial of order N to perform transcendental functions with full accuracy and uses a polynomial of order M, where M is less than N, to perform transcendental functions with less than the full accuracy, and where M is specified by the approximation policy. Advantageously, by employing a lower order polynomial to perform the transcendental function computations when in approximating mode, the approximating transcendental function computation unit 106B may consume less power and perform better than when operating in full accuracy mode. This is because employing a lower order polynomial requires fewer multiplies and adds than a higher order polynomial.

The approximating divider 106C receives input operands 166 from the registers 108 and generates the result 164 of FIG. 1. The approximating divider 106C includes dividing logic 222 and iteration control logic 224. The dividing logic 222 performs a division computation on the input operands 166 to generate an intermediate result 164 and an indication 226 of the accuracy of the intermediate result 164 during a first iteration. The intermediate result 164 is fed back as an input to the dividing logic 222, and the accuracy indication 226 is provided to iteration control logic 224. On subsequent iterations, the dividing logic 222 performs a division computation on the input operands 166 and intermediate result 164 of the previous iteration to generate another intermediate result 164 and an indication 226 of the accuracy of the intermediate result 164 during the present iteration, and the intermediate result 164 is fed back as an input to the dividing logic 222, and the accuracy indication 226 is provided to iteration control logic 224. The iteration control 224 monitors the accuracy 226 and stops the iterating once the accuracy 226 has reached an acceptable level indicated in the approximation policy 176. Advantageously, by performing fewer iterations in exchange for less than the full accuracy when the approximation policy indicates approximation mode, a reduction in power consumption may be accomplished by the approximating divider 106C.

In one embodiment, each of the approximating functional units 106 includes a lookup table that outputs the amount of error 168 associated with the result 164 generated by the approximating functional unit 106 based on the input error 162 and approximating amount of the approximation policy. Preferably, the amount of error 168 output by the lookup table is itself an approximation that specifies a maximum amount of error associated with the result 164.

In one embodiment, the approximating functional units 106 include an instruction decoder that decodes microinstructions generated by the instruction translator 104 when translating the approximating instructions 399 in order to determine all or a portion of the approximation policy rather than, or in addition to, the approximation policy provided by the approximation control register 132. In another embodiment, the instruction decoder decodes the approximating instructions 399 themselves, e.g., in an embodiment in which the instruction translator 104 simply decodes instructions 174 for the purpose of routing to the appropriate approximating functional unit 106, and the approximating functional unit 106 decodes the instructions 174 to determine the approximation policy.

Referring now to FIG. 3, a block diagram illustrating approximation instructions 399 is shown. More specifically, the approximation instructions include a computation instruction with an approximation prefix 300, an approximate computation instruction 310, a computation instruction with a start approximation prefix 320, a start approximation instruction 330, a computation instruction with a stop approximation prefix 340, a stop approximation instruction 350, a computation instruction with a clear error prefix 360, a clear error instruction 370, and a load register instruction 380.

The computation instruction with an approximation prefix 300 includes an opcode and other fields 304 such as generally found in the instruction set of the processor 100. The opcode 304 may specify any of various computations that may be performed by the approximating functional units 106, such as addition, subtraction, multiplication, division, fused multiply add, square root, reciprocal, reciprocal square root, and transcendental functions, for example, that are susceptible to generating a result that has less accuracy than the full accuracy with which the approximating functional units 106 are capable of performing the computation, i.e., according to the full accuracy mode. The computation instruction with an approximation prefix 300 also includes an approximation prefix 302. In one embodiment, the approximation prefix 302 comprises a predetermined value whose presence within the stream of instruction bytes and preceding the opcode and other fields 304 instructs the processor 100 to perform the specified computation in an approximating manner. In one embodiment, the predetermined value is a value not already in use as a prefix value in the ISA, such as the x86 ISA. In one embodiment, a portion of the approximation prefix 302 specifies the approximation policy, or at least a portion thereof, such as the approximation amount and/or error bound, to be employed in the computation specified by the opcode and other fields 304. In another embodiment, the approximation prefix 302 simply indicates that the computation specified by the opcode and other fields 304 should be performed approximately, and the approximation policy is taken from the overall approximation policy previously communicated by the to the processor 100, which may be stored, for example, in a register, such as the approximation control register 132. Other embodiments are contemplated in which the approximation policy for the instruction 300 is derived from a combination of the prefix 302 and the overall approximation policy.

In an alternate embodiment, the approximate computation instruction 310 includes an approximate computation opcode and other fields 312. The approximate computation opcode value is distinct from other opcode values in the instruction set of the processor 100. That is, the approximate computation opcode value is distinct from other opcode values that normally (e.g., in the absence of a prefix, such as approximation prefix 302) instruct the processor 100 to perform a computation with full accuracy. Preferably, the instruction set includes multiple approximate computation instructions 310, one for each type of computation, e.g., one for addition with its own distinct opcode value, one for subtraction with its own distinct opcode value, and so forth.

The computation instruction with start approximation prefix 320 includes an opcode and other fields 314 such as generally found in the instruction set of the processor 100. The opcode 314 may specify any of various computations, or it may be a non-computation instruction. The computation instruction with start approximation prefix 320 also includes a start approximation prefix 322. In one embodiment, the start approximation prefix 322 comprises a predetermined value whose presence within the stream of instruction bytes and preceding the opcode and other fields 324 instructs the processor 100 to perform subsequent computations (including the computation specified in the instruction 320, if present) in an approximating manner until instructed to stop performing computations in an approximating manner (e.g., by instructions 340 and 350 described below). In one embodiment, the predetermined value is a value not already in use as a prefix value in the ISA, such as the x86 ISA, and is distinct from the other prefixes described herein (e.g., approximation prefix 302, stop approximation prefix 342 and clear error prefix 362). Embodiments of the start approximation prefix 322 are similar to the approximation prefix 302 in that a portion of the start approximation prefix 322 may specify the approximation policy, or simply indicate that subsequent computations should be performed approximately using the overall approximation policy, or a combination thereof.

In an alternate embodiment, the start approximation instruction 330 includes a start approximation opcode 332. The start approximation instruction 330 instructs the processor 100 to perform subsequent computations in an approximating manner until instructed to stop performing computations in an approximating manner. Embodiments of the start approximation opcode 332 are similar to the approximation prefix 302 regarding specification of the approximation policy. The start approximation opcode 332 value is distinct from other opcode values in the instruction set of the processor 100.

The computation instruction with stop approximation prefix 340 includes an opcode and other fields 344 such as generally found in the instruction set of the processor 100. The opcode 344 may specify any of various computations, or it may be a non-computation instruction. The computation instruction with stop approximation prefix 340 also includes a stop approximation prefix 342. In one embodiment, the stop approximation prefix 342 comprises a predetermined value whose presence within the stream of instruction bytes and preceding the opcode and other fields 344 instructs the processor 100 to stop performing computations (including the computation specified in the instruction 340, if present) in an approximating manner (until instructed to perform computations in an approximating manner, e.g., by instructions 300, 310, 320 or 330). In one embodiment, the predetermined value is a value not already in use as a prefix value in the ISA, such as the x86 ISA, and is distinct from the other prefixes described herein.

In an alternate embodiment, the stop approximation instruction 350 includes a stop approximation opcode 352. The stop approximation instruction 350 instructs the processor 100 to stop performing computations in an approximating manner (until instructed to perform computations in an approximating manner). The stop approximation opcode 352 value is distinct from other opcode values in the instruction set of the processor 100. In one embodiment, the generation of an exception by the processor 100 also instructs the processor 100 to stop performing computations in an approximate manner, i.e., causes the approximation mode to be set to full accuracy.

The computation instruction with clear error prefix 360 includes an opcode and other fields 364 such as generally found in the instruction set of the processor 100. The opcode 364 may specify any of various computations. The computation instruction with clear error prefix 360 also includes a register field 366 that specifies a destination register to which the processor 100 writes the result of the computation. The computation instruction with clear error prefix 360 also includes a clear error prefix 362. In one embodiment, the clear error prefix 362 comprises a predetermined value whose presence within the stream of instruction bytes and preceding the opcode and other fields 364 instructs the processor 100 to clear the error 109 associated with the register 108 specified by the register field 366. In one embodiment, the predetermined value is a value not already in use as a prefix value in the ISA, such as the x86 ISA, and is distinct from the other prefixes described herein.

In an alternate embodiment, the clear error instruction 370 includes a clear error opcode 372 and a register field 376. The clear error instruction 370 instructs the processor 100 to clear the error 109 associated with the register 108 specified by the register field 376. The clear error opcode 372 value is distinct from other opcode values in the instruction set of the processor 100.

The load register and clear error instruction 380 includes a load register opcode 382, memory address operand fields 384 and a register field 386. The opcode 382 instructs the processor 100 to load data from a memory location specified by the memory address operands 384 into the destination register specified in the register field 386. The opcode 382 also instructs the processor 100 to clear the error 109 associated with the register 108 specified by the register field 386.

In one embodiment, the clear error instruction 370 clears the error 109 for all registers 108, rather than a single register 108. For example, the register field 376 value may a predetermined value to indicate to clear all registers 108. A similar embodiment is contemplated with respect to the computation instruction with a clear error prefix 360 and the load register and clear error instruction 380.

In one embodiment, the instruction translator 104 maintains a flag that indicates whether the processor 100 is in approximate computation mode or full accuracy mode. For example, the instruction translator 104 may set the flag in response to encountering a start approximation instruction 330 or a computation instruction with start approximation prefix 320 and may clear the flag in response to encountering a stop approximation instruction 350 or a computation instruction with stop approximation prefix 340. Each microinstruction includes an indicator that indicates whether the computation specified by the microinstruction should be performed with full accuracy or in an approximate manner. When the instruction translator 104 translates an architectural instruction 166 into one or more microinstructions, the instruction translator 104 populates the indicator accordingly based on the current value of the mode flag. Alternatively, in the case of an architectural approximate computation instruction such as 300 or 310, the instruction translator 104 populates the indicator of the microinstruction according to the prefix 302 or opcode 312, respectively. In yet another embodiment, the indicator of the microinstruction comprises a microinstruction opcode (distinct within the microarchitectural instruction set) that specifies an approximate computation.

Figure 4A:
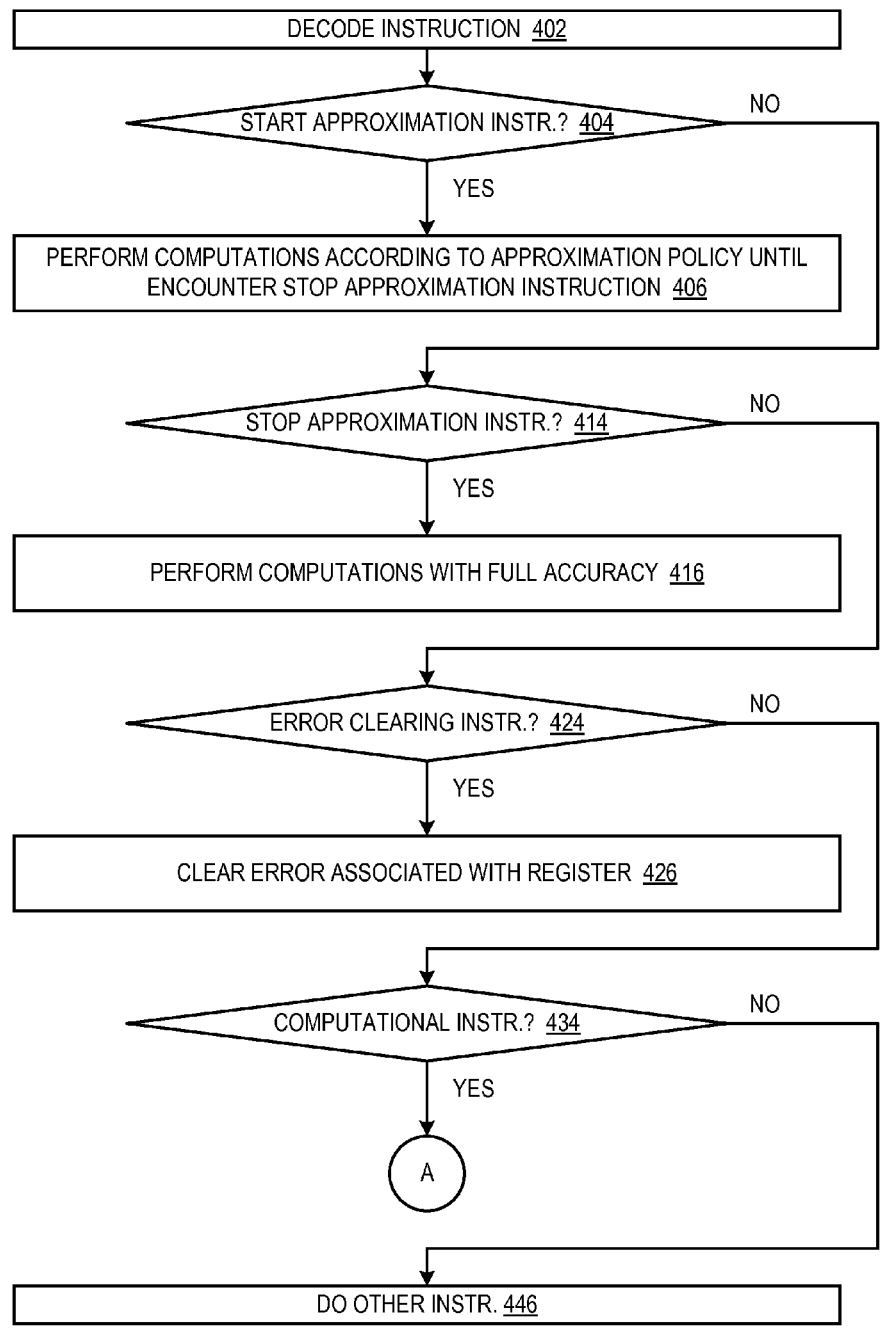
FIGS. 4A and 4B are a flowchart illustrating operation of the processor of FIG. 1 according to one embodiment.
Figure 4B:
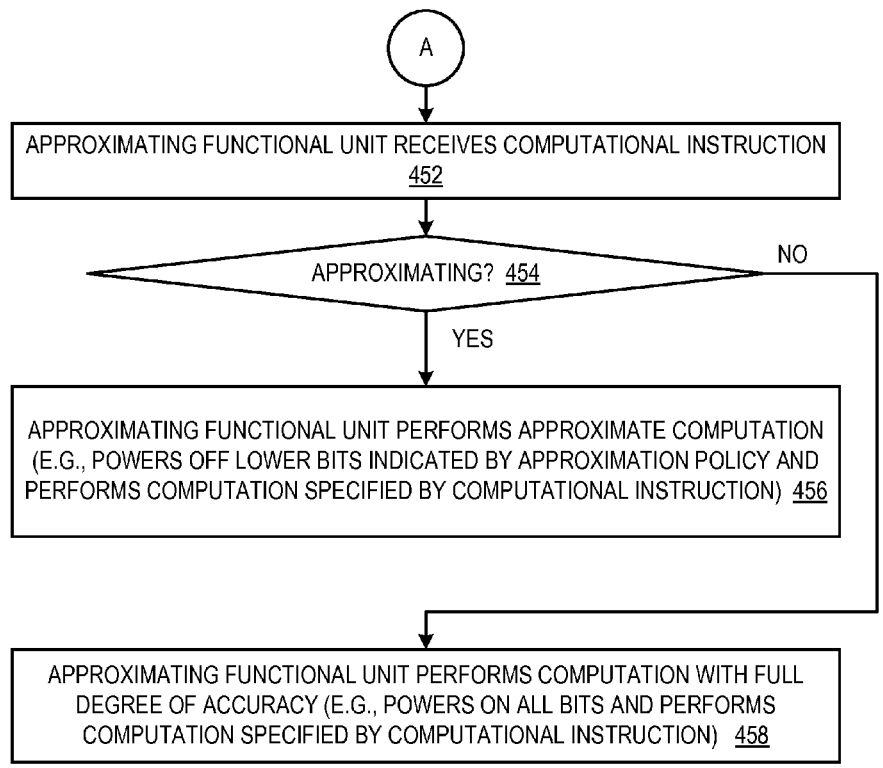

Referring now to FIG. 4, a flowchart illustrating operation of the processor 100 of FIG. 1 according to one embodiment is shown. Flow begins at block 402.

At block 402, the processor 100 decodes an architectural instruction 166. Flow proceeds to decision block 404.

At decision block 404, the processor 100 determines whether the instruction 166 is a start approximation instruction, e.g., 320 or 330 of FIG. 3. If so, flow proceeds to block 406; otherwise, flow proceeds to decision block 414.

At block 406, the processor 100 performs subsequent computations according to the approximation policy (e.g., specified in the start approximation instruction, the approximation policy specified in the approximation control register 132, or a combination thereof) until it encounters a stop approximation instruction, e.g., 340 or 350 of FIG. 3. Flow ends at block 406.

At decision block 414, the processor 100 determines whether the instruction 166 is a stop approximation instruction, e.g., 340 or 350 of FIG. 3. If so, flow proceeds to block 416; otherwise, flow proceeds to decision block 424.

At block 416, the processor 100 stops performing computations in an approximate manner and instead performs them with full accuracy (until it encounters a start approximation instruction, e.g., 320 or 330 or approximate computation instruction 300 or 310 of FIG. 3). Flow ends at block 416.

At decision block 424, the processor 100 determines whether the instruction 166 is a clear error instruction, e.g., 360 or 370 or 380 of FIG. 3. If so, flow proceeds to block 426; otherwise, flow proceeds to decision block 434.

At block 426, the processor 100 clears the error 109 associated with the register 108 specified in the register field 366/376/386. Flow ends at block 426.

At decision block 434, the processor 100 determines whether the instruction 166 is a computational instruction 166. If so, flow proceeds to block 452; otherwise, flow proceeds to block 446.

At block 446, the processor 100 performs the other instruction 166, i.e., the instruction of the instruction set architecture other than the computational instructions 399. Flow ends at block 446.

At block 452, the relevant approximating functional unit 106 receives the computational instruction 166 and decodes it. Flow proceeds to decision block 454.

At decision block 454, the approximating functional unit 106 determines whether the approximation policy is approximating or full accuracy. If approximating, flow proceeds to block 456; if full accuracy, flow proceeds to block 458.

At block 456, the approximating functional unit 106 performs the computation in an approximating manner, e.g., as described herein, such as above with respect to FIG. 2. Flow ends at block 456.

At block 458, the approximating functional unit 106 performs the computation in a non-approximating manner, i.e., with full accuracy. Flow ends at block 458.

Figure 5:
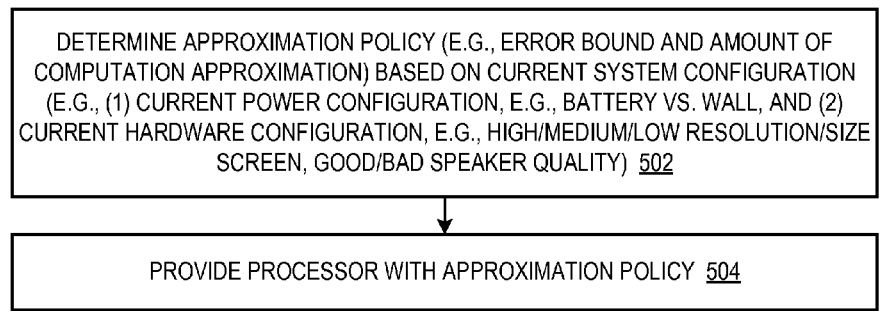
FIG. 5 is a flowchart illustrating operation of the processor of FIG. 1 within a computer system.

Referring now to FIG. 5, a flowchart illustrating operation of the processor 100 of FIG. 1 within a computer system is shown. Flow begins at block 502.

At block 502, a program (e.g., operating system or other program) executing on the processor 100 determines an approximation policy to be used by the processor 100 to perform computations. Preferably, the approximation policy specifies the tolerable error bound and the approximation amount in the computations themselves, i.e., the amount of approximation each approximating functional unit 106 should employ in each approximated calculation. The program determines the approximation policy based, at least in part, on the current system configuration. For example, the program may detect whether the computer system is operating from battery power or from an effectively limitless source, such as A/C wall power. Additionally, the program may detect the hardware configuration of the computer system, such as the display size and speaker quality. The program may consider such factors in determining the desirability and/or acceptability of performing certain computations approximately rather than with full accuracy, such as audio/video-related computations. Flow proceeds to block 504.

At block 504, the program provides the approximation policy to the processor 100. In one embodiment, the program writes the approximation policy to the approximation control register 132. In one embodiment, the program executes an x86 WRMSR instruction to provide the processor 100 with the new approximation policy. Flow ends at block 504.

Preferably, when the system configuration changes, e.g., the system gets plugged into a wall socket or unplugged from a wall socket, or plugged into an external monitor of different size, then the program detects the configuration change and changes the approximation policy at block 502 and communicates the new approximation policy to the processor 100 at block 504.

Figure 6:
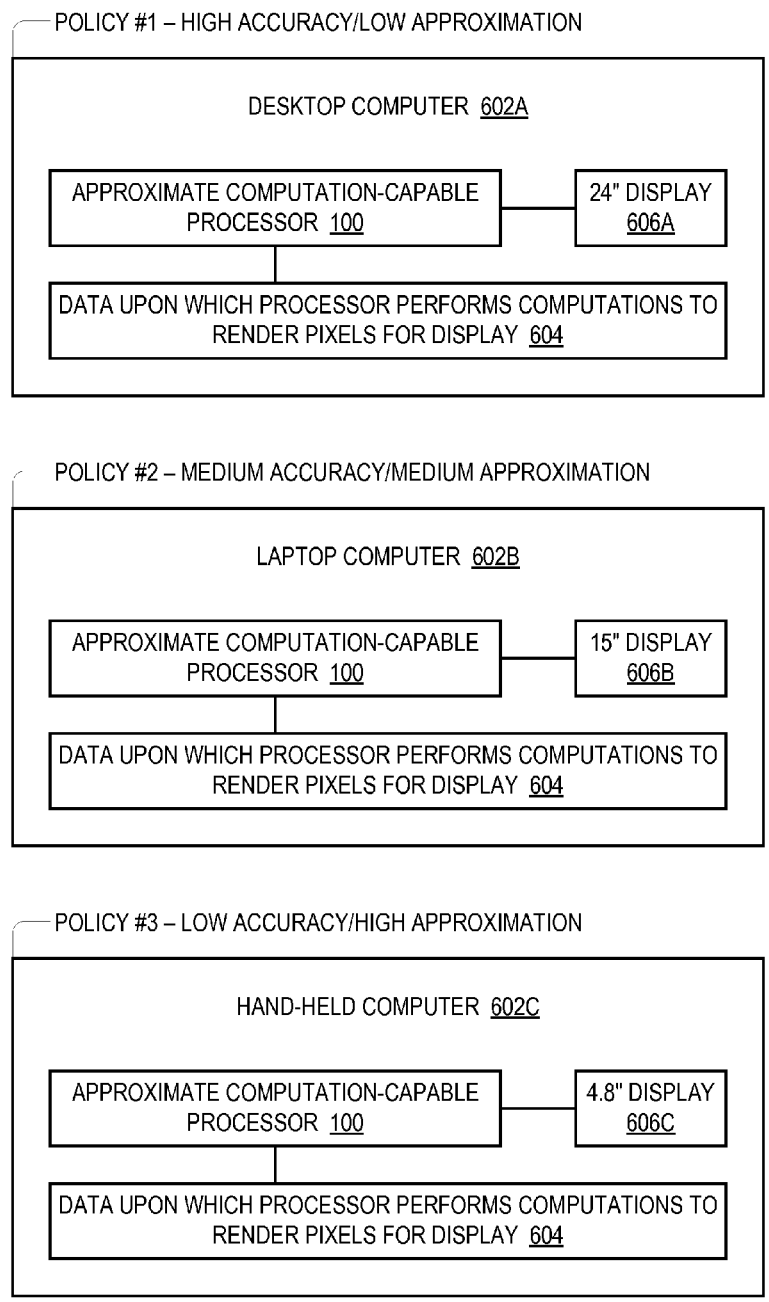
FIG. 6 is a block diagram illustrating three different computing systems.

Referring now to FIG. 6, a block diagram illustrating three different computing systems is shown. Each of the systems includes an approximation computation-capable processor 100 of FIG. 1, a display 606, and a buffer containing data 604 upon which the processor 100 performs computations to render pixels to be shown on the display 606 using, for example, the approximate computation instructions 399 of FIG. 3.

The first system is a desktop computer 602A that includes a large display 606A (e.g., 24-inch or larger) and receives power from an essentially limitless power source, e.g., a wall outlet. The second system is a laptop computer 602B that includes a medium size display 606B (e.g., 15-inch) and receives power either from a wall outlet or from a battery, depending upon the choice of the user. The third system is a hand-held computer, such as a smartphone or table computer 602C that includes a relatively small display (e.g., 4.8-inch) 606C and receives its power primarily from a battery. In the illustrative examples, it is assumed the displays all have approximately the same resolution such that the amount of approximation that may be tolerated/accepted is primarily based on the display size, although it should be understood that the amount of approximate computation may also vary based on variation in the display resolution. The three systems, referred to collectively as systems 602, are intended to be representative of systems that may include the approximation computation-capable processor 100 and are provided with different characteristics for comparison to illustrate the varying uses of the approximate computing embodiments described herein; however, other embodiments are contemplated, and the use of the approximation computation-capable processor 100 is not limited to the embodiments shown.

The first system 602A tends to be intolerant of approximation and demand high accuracy because visual distortion caused by approximation of the pixel rendering would likely be readily apparent on the large display 602A, and the power source likely renders the need for power savings due to approximate computations less necessary.

The second system 602B tends to demand a moderate amount of accuracy and tolerate a moderate amount of approximation, particularly when running on battery power, because the visual distortion caused by a moderate amount of approximation that may be apparent, although less than on a larger display with a similar resolution, may be an acceptable tradeoff for the advantage in battery life. Other the other hand, when the system 602B is plugged into a wall power source, the preferred approximation policy may be similar to that of the first system 602A.

The third system 602C tends to demand the least accuracy since the visual distortion due to approximation may be non-apparent, or largely unapparent, on a small display 606C at a nominal zoom level, and the need to save battery power is relatively great.

Figure 7:
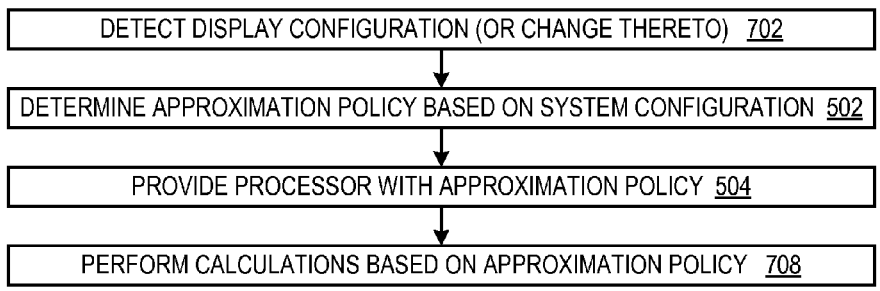
FIG. 7 is a flowchart illustrating operation of the systems of FIG. 6.

Referring now to FIG. 7, a flowchart illustrating operation of the systems 602 of FIG. 6 is shown. Flow begins at block 702.

At block 702, a program detects the type of display 606 in the system 602, such as when the system 602 is powered-on or reset. Alternatively, the program may detect a change in the display 606, e.g., when an external monitor is plugged into or unplugged from a laptop 602B. Still further, the program may detect a change in the power source, such as plugging into or unplugging from a wall outlet. Flow proceeds to block 502.

At block 502, the program determines the approximation policy based on the system configuration, as described above with respect to FIG. 5. Flow proceeds to block 504.

At block 504, the program provides the processor 100 with the approximation policy, as described above with respect to FIG. 5. Flow proceeds to block 708.

At block 708, the processor 100 performs calculations based on the received approximation policy as described herein, e.g., with respect to FIGS. 4 and 10 through 12. Flow ends at block 708.

Alternatively, the software running on the processor 100 (e.g., the graphics software) includes different routines of code (that include computation instructions 399) associated with different approximation policies (e.g., for each of the different approximation policies associated with the different system configurations of FIG. 6), and the software branches to the appropriate routine based on the current system configuration.

Figure 8:
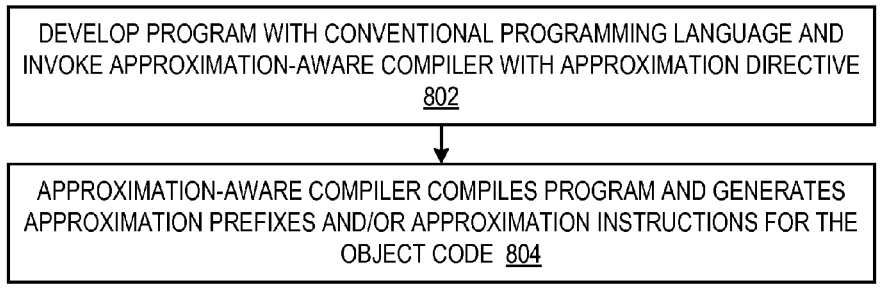
FIG. 8 is a flowchart illustrating a process for the development of software to run on an approximate computing-aware processor.

Referring now to FIG. 8, a flowchart illustrating a process for the development of software to run on an approximate computing-aware processor 100 such as described herein is shown. Flow begins at block 802.

At block 802, a programmer develops a program, such as graphics software, with a conventional programming language, such as the C language, and invokes an approximation-aware compiler with an approximation directive. The approximation-aware compiler knows the approximate computing capabilities of the target processor 100, more specifically, the set of approximation instructions 399 supported by the processor 100. The approximation directive may be a command-line option or other method of communicating to the compiler that the object code generated by the compiler should include approximation instructions 399 to perform approximate computations. Preferably, the approximation-aware compiler is invoked with the approximation directive only to compile routines in which the computations specified by the programming language are tolerant of approximate computations; whereas, other routines that are not tolerant of approximate computations are compiled without the approximation directive; and the object files generated by the respective methods are linked together into an executable program. The approximation-tolerant routines may tend to be relatively specialized routines. For example, pixel-rendering routines may include calculations on floating point data that are susceptible to approximate computations for which the approximation-aware compiler generates approximating instructions 399; whereas, loop control variables may be integer data, and the approximation-aware compiler does not generate approximating instructions 399 to perform calculations that update the loop control variables, for example. Flow proceeds to block 804.

At 804, the approximation-aware compiler compiles the program and generates machine language instructions that include approximation instructions 399 that instruct the processor 100 to perform approximate computations as object code. In one embodiment, the machine code generated by the compiler is similar to the machine code that would otherwise be generated without the use of the approximation directive, but in which some of the instructions are preceded by an approximation-related prefix, such as the approximation prefix 302, the start approximation prefix 322, the stop approximation prefix 342, or the clear error prefix 362 of FIG. 3. In one embodiment, the approximation-aware compiler generates approximate computation instructions 310 in place of normal computation instructions that it would otherwise generate in the absence of the approximation directive. In one embodiment, the approximation-aware compiler generates normal instruction sequences punctuated with start/stop approximation instructions 330/350 and/or start/stop approximation prefixes 322/342. In one embodiment, the approximation-aware compiler generates multiple code routines each of which employs a different approximation policy, as described above, and the compiler generates code that calls the appropriate subroutine based on the current system configuration, which the program may determine itself or may obtain from the operating system. Flow ends at block 804.

Figure 9:
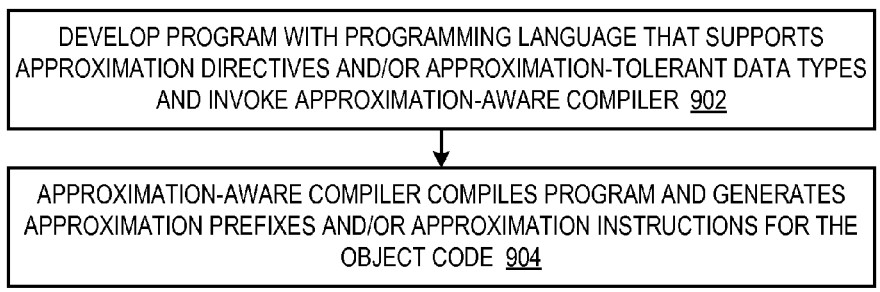
FIG. 9 is a flowchart illustrating an alternate process for the development of software to run on an approximate computing-aware processor.

Referring now to FIG. 9, a flowchart illustrating an alternate process for the development of software to run on an approximate computing-aware processor 100 such as described herein is shown. Flow begins at block 902.

At block 902, a programmer develops a program similar to the description at block 802 and invokes an approximation-aware compiler. However, the programming language and compiler support approximation directives and/or approximation-tolerant data types. For example, a dialect of the C language may support such directives and/or data types. The approximation directives may include compiler directives (e.g., similar to the C language #include or #define directives) that the programmer may include in the source code to mark selective program variables as approximation-tolerant data. Similarly, the programmer may include in the source code program variables declared as approximation-tolerant data type variables for which the compiler knows to generate instructions 399 that cause approximate computations to be performed on the variables. Flow proceeds to block 904.

At block 904, the approximation-aware compiler compiles the program to generate object code similar to the manner described above with respect to block 804, but in response to the approximation directives and/or approximation-tolerant data types included in the source code being compiled. Flow ends at block 904.

Figure 10:
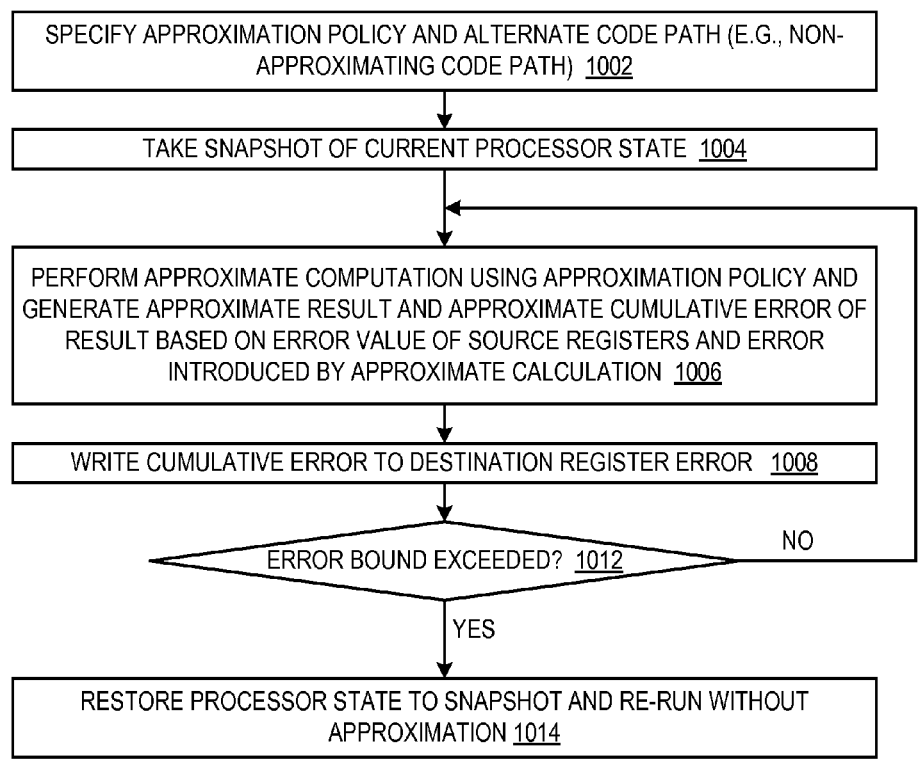
FIG. 10 is a flowchart illustrating operation of the processor of FIG. 1 to run a program that performs approximate computations.

Referring now to FIG. 10, a flowchart illustrating operation of the processor 100 of FIG. 1 to run a program that performs approximate computations is shown. Flow begins at block 1002.

At block 1002, the program provides an approximation policy to the processor 100, similar to the manner described above. Alternatively, the program itself provides the approximation policy (and restores the current approximation policy upon exit). Additionally, an alternate code path is specified that does not perform approximate computations that may be executed in the event that the error threshold is exceeded, as described below. Flow proceeds to block 1004.

At block 1004, the processor 100 takes a snapshot of its current state by writing its state to the snapshot storage 134 of FIG. 1. In one embodiment, the processor 100 takes the snapshot in response to encountering an instruction executed by the program. In one embodiment, the instruction comprises an x86 WRMSR instruction. In one embodiment, taking the snapshot includes writing back to memory dirty cache lines that will be touched by the set of approximate computations of the program so that clean copies of the cache lines reside in the cache 138 and then marking the cache lines as special to denote they may be the target of approximate computations. Because the cache lines are marked as special, as they are modified by the results of approximate computations, they are not written back to memory—at least not until it has been verified that the program can complete without exceeding the acceptable error bound. Consequently, if subsequently the processor 100 determines that the error bound has been exceeded (e.g., at block 1012), then the special cache lines are invalidated and marked as non-special, and the pre-approximate computation state of the cache lines is then available in memory for the subsequent non-approximate set of computations (e.g., at block 1014). In such an embodiment, the programmer must be aware that the special cache lines must not spill out of the cache 138; otherwise, the processor 100 treats such a condition as exceeding the error bounds. Preferably, in a multi-core processor embodiment, the cache 138 must be local to the core executing the set of approximate computations. Flow proceeds to block 1006.

At block 1006, the processor 100, in particular an approximating functional unit 106, performs an approximate computation specified by a program instruction based on the approximation policy to generate an approximate result 164. The approximating functional unit 106 also approximates the error 168 of the result 164 based on the error values 162 of the input operands and the error introduced by the approximate calculation, as described above. Flow proceeds to block 1008.

At block 1008, the approximating functional unit 106 writes the cumulative error 168 to the error storage 109 associated with the destination register 108 that receives the approximate result 164. Flow proceeds to decision block 1012.

At decision block 1012, the processor 100 determines whether the error 168 generated at block 1008 exceeds the error bound of the approximation policy. If so, flow proceeds to block 1014; otherwise, flow returns to block 1006 to execute another approximate computation of the program.

At block 1014, the processor 100 restores the processor 100 state to the snapshot that is stored in the snapshot storage 134 and re-runs the program without approximation, or at least a portion thereof after the taking of the snapshot at block 1004 that involved computations performed in an approximate manner that exceeded the error bound. Embodiments of the operation of block 1014 are described below with respect to FIGS. 11 and 12. Flow ends at block 1014.

Figure 11:
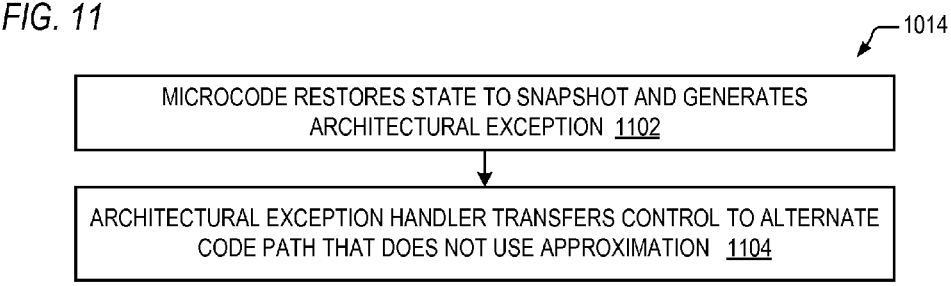
FIG. 11 is a flowchart illustrating in greater detail operation of block 1014 of FIG. 10 according to one embodiment.

Referring now to FIG. 11, a flowchart illustrating in greater detail operation of block 1014 of FIG. 10 according to one embodiment is shown. Flow begins at block 1102.

At block 1102, control is transferred to the microcode 136 of the processor 100 via a micro-exception (i.e., a non-architectural exception) generated in response to detecting that the error bound was exceeded at decision block 1012. The microcode 136 restores the processor 100 state to the snapshot as described above with respect to FIG. 10. Additionally, the microcode 136 generates an architectural exception. Flow proceeds to block 1104.

At block 1104, the architectural exception handler transfers control to the alternate code path specified at block 1002 of FIG. 10 so that the set of approximate computations are performed with full accuracy. In one embodiment, the exception handler sets the approximation policy to disable approximation (i.e., sets the approximation policy to full accuracy) and then jumps to the same code that was previously executed when approximation was enabled and which will now be executed with approximation disabled. Flow ends at block 1104.

Figure 12:
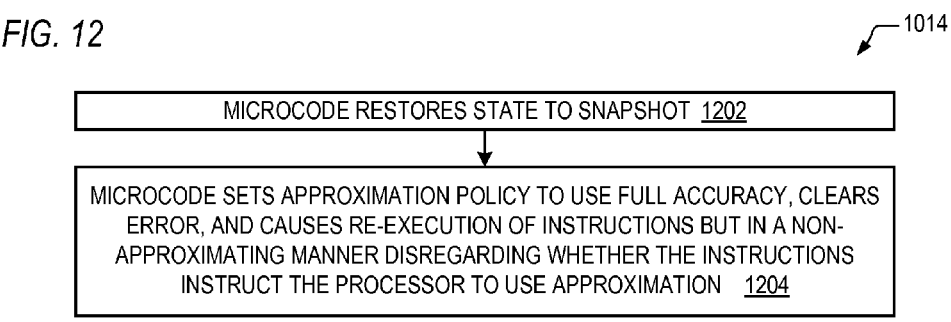
FIG. 12 is a flowchart illustrating in greater detail operation of block 1014 of FIG. 10 according to an alternate embodiment.

Referring now to FIG. 12, a flowchart illustrating in greater detail operation of block 1014 of FIG. 10 according to an alternate embodiment is shown. Flow begins at block 1202.

At block 1202, control is transferred to the microcode 136 of the processor 100 via a micro-exception generated in response to detecting that the error bound was exceeded, and the microcode 136 restores the processor 100 state to the snapshot. Flow proceeds to block 1204.

At block 1204, the microcode 136 sets the approximation policy (e.g., writes the approximation control register 132) to full accuracy. The microcode 136 also clears the error values 109 associated with all the registers 108. The microcode 136 also causes re-execution of the program, e.g., from the point after the taking of the snapshot at block 1004. In one embodiment, the microcode 136 re-runs the program from an instruction address stored in the snapshot storage 134. Flow ends at block 1204.

Although embodiments have been described in which approximate computations are performed for audio and video purposes, other embodiments are contemplated in which approximate computations are performed for other purposes, such as sensor calculations used in computer game physics calculations. For example, the analog-to-digital converter values used in the calculations may only be accurate to 16 bits, such that game physics analysis using 53 bits of precision, for example, is unnecessary.

While various embodiments of the present invention have been described herein, it should be understood that they have been presented by way of example, and not limitation. It will be apparent to persons skilled in the relevant computer arts that various changes in form and detail can be made therein without departing from the scope of the invention. For example, software can enable, for example, the function, fabrication, modeling, simulation, description and/or testing of the apparatus and methods described herein. This can be accomplished through the use of general programming languages (e.g., C, C++), hardware description languages (HDL) including Verilog HDL, VHDL, and so on, or other available programs. Such software can be disposed in any known computer usable medium such as magnetic tape, semiconductor, magnetic disk, or optical disc (e.g., CD-ROM, DVD-ROM, etc.), a network, wire line, wireless or other communications medium. Embodiments of the apparatus and method described herein may be included in a semiconductor intellectual property core, such as a processor core (e.g., embodied, or specified, in a HDL) and transformed to hardware in the production of integrated circuits. Additionally, the apparatus and methods described herein may be embodied as a combination of hardware and software. Thus, the present invention should not be limited by any of the exemplary embodiments described herein, but should be defined only in accordance with the following claims and their equivalents. Specifically, the present invention may be implemented within a processor device that may be used in a general-purpose computer. Finally, those skilled in the art should appreciate that they can readily use the disclosed conception and specific embodiments as a basis for designing or modifying other structures for carrying out the same purposes of the present invention without departing from the scope of the invention as defined by the appended claims.

The invention claimed is:

1. A processor, comprising:
   a decoder, configured to decode an instruction that instructs the processor to perform subsequent computations in an approximate manner;
   architectural registers configured to hold operands;
   error storage associated with each architectural register that is configured to indicate an amount of error in a result stored in the architectural register; and
   a functional unit, configured to receive one or more operands from the architectural registers and error amounts from the associated error storages, perform a subsequent computation on the operands in the approximate manner in response to the instruction, accumulate the error amounts associated with the one or more operands prior to the approximate computation with an error amount introduced by performing the approximate computation, and store the result and the accumulated error amount in a destination architectural register and its associated error storage.

2. The processor of claim 1, wherein the instruction comprises a prefix that instructs the processor to perform the computations in the approximate manner.

3. The processor of claim 2, wherein the prefix specifies a degree of accuracy less than a full degree of accuracy with which the processor is to perform the computations.

4. The processor of claim 1,
   wherein the decoder is further configured to decode a second instruction that instructs the processor to perform second subsequent computations with a full degree of accuracy; and
   wherein the functional unit is configured to perform the second subsequent computations with the full degree of accuracy in response to the second instruction.

5. The processor of claim 4, wherein the second instruction comprises a prefix that instructs the processor to perform the second subsequent computations with the full degree of accuracy.

6. The processor of claim 1, further comprising:
   an approximation control register, configured to hold information specifying an approximation policy for the processor, wherein the approximation policy includes a specification of a maximum tolerable accumulated error amount over a plurality of instruction executions;
   wherein the processor is configured to generate an exception when the amount of error stored in the error storage exceeds the specified maximum tolerable accumulated error amount.

7. The processor of claim 6, wherein the approximation policy further specifies an amount of approximating that the functional unit should employ in each approximated calculation, wherein the functional unit is configured to tailor its approximation on the basis of the approximation amount, so that subsequent calculations are constrained both by the approximation amount and the maximum tolerable accumulated error amount.

8. The processor of claim 6, wherein the processor is configured to determine a current system configuration and set an approximation policy on the basis of the current system configuration.

9. The processor of claim 8, wherein the current system configuration includes a monitor resolution, and the processor is configured to set an approximation policy that accepts a relatively greater amount of error in video-related computations with a low-resolution monitor than with a high-resolution monitor.

10. The processor of claim 8, wherein the current system configuration includes speaker quality, and the processor is configured to set an approximation policy that accepts a relatively greater amount of error in audio-related computations with a relatively lower quality speaker than with a relatively higher-quality monitor.

11. The processor of claim 8, wherein the processor is configured to detect changes in the current system configuration and modify the approximation policy.

12. The processor of claim 1, wherein the functional unit is configured to perform transcendental functions on input operands to generate a result based on a polynomial, wherein the functional unit is configured to select a first polynomial if instructed to perform a full-accuracy computation and a relatively lower-order second polynomial if instructed to perform an approximate computation.

13. The processor of claim 1, wherein the functional unit is a divider configured with dividing logic and iteration control logic, wherein:
the dividing logic is configured perform an iterative division computation on the input operands to generate an intermediate result and an indication of an accuracy of the intermediate result during each of a plurality of iterations, and to feed the intermediate result back as an input to the dividing logic; and
the iteration control logic is configured to stop the iterations once an accuracy has reached a level specified in an approximation policy.

14. A method performed by a processor, the method comprising:
decoding, by the processor, an instruction that instructs the processor to perform subsequent computations in an approximate manner;
storing operands in architectural registers of the processor;
providing one or more operands along with error amounts associated with each operand to a functional unit of the processor, wherein the error amounts are stored in error storage associated with each architectural register;
performing, by the functional unit, the subsequent computations in the approximate manner in response to said decoding the instructions; and
accumulating the error amounts associated with the one or more operands prior to the approximate computation with an error amount introduced by performing the approximate computation; and
storing the result and the accumulated error amount in a destination register and its associated error storage.

15. The method of claim 14, wherein the instruction comprises a prefix that instructs the processor to perform the computations in the approximate manner.

16. The method of claim 15, wherein the prefix specifies a degree of accuracy less than a full degree of accuracy with which the processor is to perform the computations.

17. The method of claim 14, further comprising:
decoding, by the processor, a second instruction that instructs the processor to perform second subsequent computations with a full degree of accuracy; and
performing, by the processor, the second subsequent computations with the full degree of accuracy in response to said decoding the second instruction.

18. The method of claim 17, wherein the second instruction comprises a prefix that instructs the processor to perform the second subsequent computations with the full degree of accuracy.

19. The method of claim 14, further comprising:
storing information specifying an approximation policy for the processor in an approximation control register, wherein the approximation policy includes a specification of a maximum tolerable accumulated error amount over a plurality of instruction executions;
generating an exception when the amount of error stored in the error storage exceeds the specified maximum tolerable accumulated error amount.

20. The method of claim 19, determining a current system configuration and setting an approximation policy on the basis of the current system configuration.

21. The method of claim 20, wherein the current system configuration includes a monitor resolution, the method further comprising setting an approximation policy that accepts a relatively greater amount of error in video-related computations with a low-resolution monitor than with a high-resolution monitor.

22. The method of claim 20, wherein the current system configuration includes speaker quality, the method further comprising setting an approximation policy that accepts a relatively greater amount of error in audio-related computations with a relatively lower quality speaker than with a relatively higher-quality monitor.

23. The method of claim 20, further comprising detecting changes in the current system configuration and modify the approximation policy.

24. The method of claim 14, further comprising:
performing, by the functional unit, transcendental functions on input operands to generate a result based on a polynomial, and
selecting a first polynomial if instructed to perform a full-accuracy computation and a relatively lower-order second polynomial if instructed to perform an approximate computation.

25. The method of claim 14, further comprising
performing, by the functional unit, an iterative division computation on the input operands to generate an intermediate result and an indication of an accuracy of the intermediate result during each of a plurality of iterations, and to feed the intermediate result back as an input to the dividing logic; and
stopping the iterations once an accuracy has reached a level specified in an approximation policy.

* * * * *